(12) United States Patent
Takatori

(10) Patent No.: US 9,568,163 B2
(45) Date of Patent: Feb. 14, 2017

(54) LUMINOUS FLUX CONTROL MEMBER, LIGHT EMITTING APPARATUS, ILLUMINATING APPARATUS, AND DISPLAY APPARATUS

(71) Applicant: Enplas Corporation, Saitama (JP)

(72) Inventor: Hiroshi Takatori, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 14/409,631

(22) PCT Filed: Jun. 11, 2013

(86) PCT No.: PCT/JP2013/003649
§ 371 (c)(1),
(2) Date: Dec. 19, 2014

(87) PCT Pub. No.: WO2013/190801
PCT Pub. Date: Dec. 27, 2013

(65) Prior Publication Data
US 2015/0176801 A1 Jun. 25, 2015

(30) Foreign Application Priority Data
Jun. 22, 2012 (JP) ................. 2012-140930

(51) Int. Cl.
*F21V 7/00* (2006.01)
*F21V 5/04* (2006.01)
(Continued)

(52) U.S. Cl.
CPC ............... *F21V 7/0016* (2013.01); *F21S 8/04* (2013.01); *F21V 5/04* (2013.01); *F21V 5/08* (2013.01);
(Continued)

(58) Field of Classification Search
CPC ............ F21Y 2101/02; F21Y 2105/001; F21Y 2113/005; F21Y 2113/002; F21Y 2101/00; F21Y 2105/10; F21Y 2113/10; F21V 5/04; F21V 7/0091; F21V 13/04; F21V 5/046; F21V 5/08; F21S 48/1154; F21S 48/115; F21S 48/236; F21S 48/24; G02B 19/0028; G02B 19/0061; H01L 33/54
See application file for complete search history.

(56) References Cited

U.S. PATENT DOCUMENTS 5,381,309 A * 1/1995 Borchardt ............ G02B 6/0013
362/23.15
7,591,578 B2 * 9/2009 Chang ............... G02F 1/133602
362/612
(Continued)

FOREIGN PATENT DOCUMENTS

JP 2004-281605 A 10/2004
JP 2006-108640 A 4/2006
(Continued)

*Primary Examiner* — Hargobind S Sawhney
(74) *Attorney, Agent, or Firm* — Brundidge & Stanger, P.C.

(57) ABSTRACT

A light flux controlling member (100) of the present invention has: an incident part (110) that receives light emitted from a light emitting element (210); a total reflection surface (120) that reflects a part of light incident from the incident part (110) toward a front side; a first emission part (130) that emits incident light received directly from the incident part (110) and light reflected at the total reflection surface (120) toward the outside; and a second emission part (160) that is protruded to the outside from the total reflection surface (120) and emits another part of light incident from the emission part (110) toward the outside.

10 Claims, 20 Drawing Sheets

(51) Int. Cl.
    *G02B 19/00*    (2006.01)
    *F21S 8/04*    (2006.01)
    *F21V 5/08*    (2006.01)
    *F21V 7/05*    (2006.01)
    *F21V 33/00*    (2006.01)
    *F21Y 101/00*    (2016.01)

(52) U.S. Cl.
    CPC ............... *F21V 7/0091* (2013.01); *F21V 7/05* (2013.01); *F21V 33/0052* (2013.01); *G02B 19/0028* (2013.01); *F21Y 2101/00* (2013.01); *F21Y 2103/10* (2016.08); *F21Y 2115/10* (2016.08)

(56) References Cited

U.S. PATENT DOCUMENTS

| | | | |
|---|---|---|---|
| 2004/0207999 A1 | 10/2004 | Suehiro et al. | |
| 2006/0060867 A1 | 3/2006 | Suehiro | |
| 2012/0300139 A1* | 11/2012 | Lee ..................... | G02B 6/0096 348/790 |

FOREIGN PATENT DOCUMENTS

| | | |
|---|---|---|
| JP | 2009-289506 A | 12/2009 |
| JP | 2011-222380 A | 11/2011 |

* cited by examiner

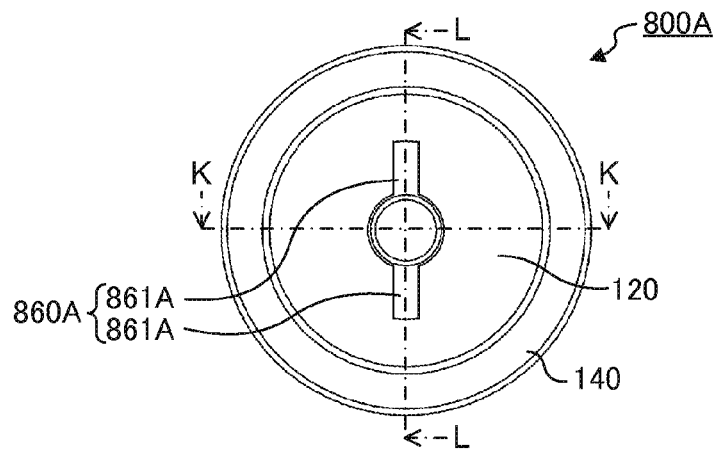
FIG. 12A
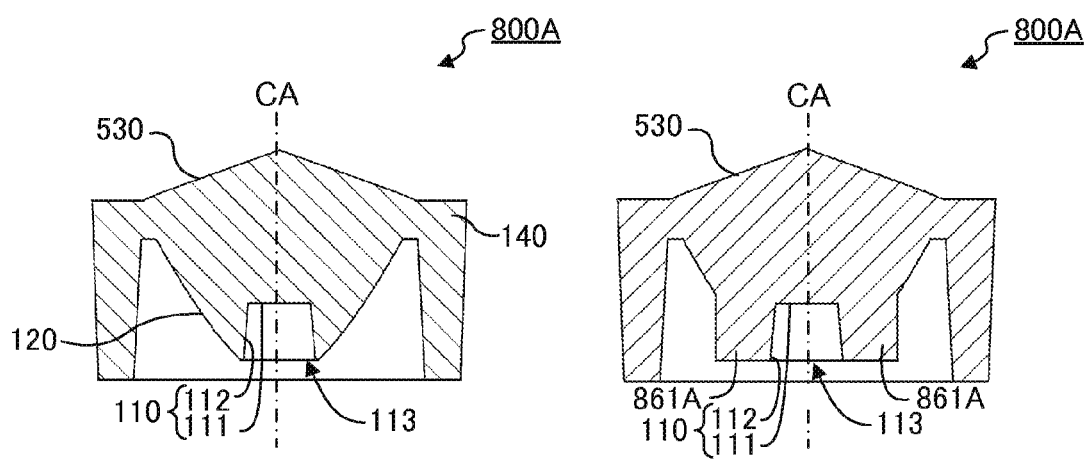
FIG. 12B
FIG. 12C

LUMINOUS FLUX CONTROL MEMBER, LIGHT EMITTING APPARATUS, ILLUMINATING APPARATUS, AND DISPLAY APPARATUS

TECHNICAL FIELD

The present invention relates to a light flux controlling member that controls a distribution of light emitted from a light emitting element. In addition, the present invention relates to a light emitting device having the light flux controlling member, an illumination apparatus having the light emitting device, and a display apparatus having the illumination apparatus.

BACKGROUND ART

Recently, a light-emitting diode (hereinafter, referred to as "LED") has been increasingly used as a light source for a surface light source device of an edge-lit type with a hollow structure without using a light guide plate. In such a surface light source device, there is a case where a combination of an LED and a light flux controlling member (condenser lens) may be used in order to control the distribution of light emitted from the LED (see, for example, PTL 1).

PTL 1 sets forth an illumination apparatus having a square-shaped frame, a pair of light diffusing plates (members to be irradiated) disposed so as to cover opposing openings of the frame, a plurality of LEDs disposed linearly on one internal surface of the frame, and one condenser lens that covers the plurality of LEDs. In the illumination apparatus of PTL 1, the sectional shape of the condenser lens in a direction orthogonal to the arrangement direction of LEDs is the same in any point of the condenser lens. The illumination apparatus set forth in PTL 1 makes the distribution of light emitted from an LED narrower with the condenser lens. In this manner, the illumination apparatus set forth in PTL 1 can illuminate the light diffusing plate unifoimly to some degree by propagating light emitted from an LED farther.

CITATION LIST

Patent Literature

PTL 1
Japanese Patent Application Laid-Open No. 2009-289506

SUMMARY OF INVENTION

Technical Problem

In the illumination apparatus of PTL 1, the sectional shape of the condenser lens in a direction orthogonal to the arrangement direction of LEDs does not vary (the condenser lens does not have a curvature for the arrangement direction of LEDs), and thus the expansion of light could not be controlled for the arrangement direction of LEDs. Therefore, in the illumination apparatus of PTL 1, there has been a problem of insufficient amount of light at a distal site in the optical axis direction of an LED.

As a method for solving this problem, it is considered that, for each LED, a lens that makes the distribution of light emitted from the LED narrower for every direction should be allocated. However, if a lens that makes the light distribution narrower for every direction is adopted, there occurs a dark part between the disposed LEDs, causing a new problem of not being able to illuminate the light diffusing plate uniformly.

An object of the present invention is to provide a light flux controlling member capable of controlling the distribution of light emitted from a light emitting element so as to irradiate light uniformly to a member to be irradiated. Further, an object of the present invention is to provide a light emitting device, an illumination apparatus, and a display apparatus having the light flux controlling member.

Solution to Problem

The light flux controlling member of the present invention is a light flux controlling member that controls the distribution of light emitted from a light emitting element, the member having an incident part that is formed at a back side of the light flux controlling member so as to intersect a central axis of the light flux controlling member and that receives light emitted from the light emitting element, a total reflection surface that is formed so as to surround the central axis and so as to have a diameter that gradually increases from the back side toward a front side of the light flux controlling member and that reflects a part of light incident from the incident part toward the front side, a first emission part that is formed at the front side so as to intersect the central axis and that emits incident light received directly from the incident part and light reflected at the total reflection surface toward the outside, and a second emission part that is protruded to the outside from the total reflection surface and emits another part of light incident from the emission part toward the outside.

A light emitting device of the present invention has a light flux controlling member of the present invention and a light emitting element, and a central axis of the light flux controlling member and an optical axis of the light emitting element coincide with each other.

An illumination apparatus of the present invention has a light emitting device of the present invention and a member to be irradiated with light emitted from the light emitting device, and the light emitting device is disposed such that, the larger the emission angle of light emitted from the light emitting device relative to the optical axis of the light emitting element becomes, the smaller the incident angle to the member to be irradiated becomes.

A display apparatus of the present invention has an illumination apparatus of the present invention and a display member that is irradiated with light emitted from the illumination apparatus.

Advantageous Effects of Invention

The illumination apparatus having the light flux controlling member of the present invention is capable of uniformly irradiating a member to be irradiated (e.g., light-emitting planar member, wall surface, etc.) disposed substantially parallel to an optical axis of the light emitting element, compared to conventional illumination apparatuses. Therefore, the illumination apparatus of the present invention has less luminance unevenness compared to conventional illumination apparatuses (e.g., surface light source device).

BRIEF DESCRIPTION OF DRAWINGS

FIGS. 12A to 12C are drawings showing the configuration of the light flux controlling member of a modification of Embodiment 5;

DESCRIPTION OF EMBODIMENTS

In the following, embodiments of the present invention will be described in detail with reference to the accompanying drawings. The following description explains a surface light source device suitable for a backlight of a liquid crystal display apparatus, as a typical example of the illumination apparatus of the present invention. The surface light source device can be used as a display apparatus by combining it with a display member such as a liquid crystal panel.

Embodiment 1

Configurations of Surface Light Source Device and Light Emitting Device

Figure 1A:
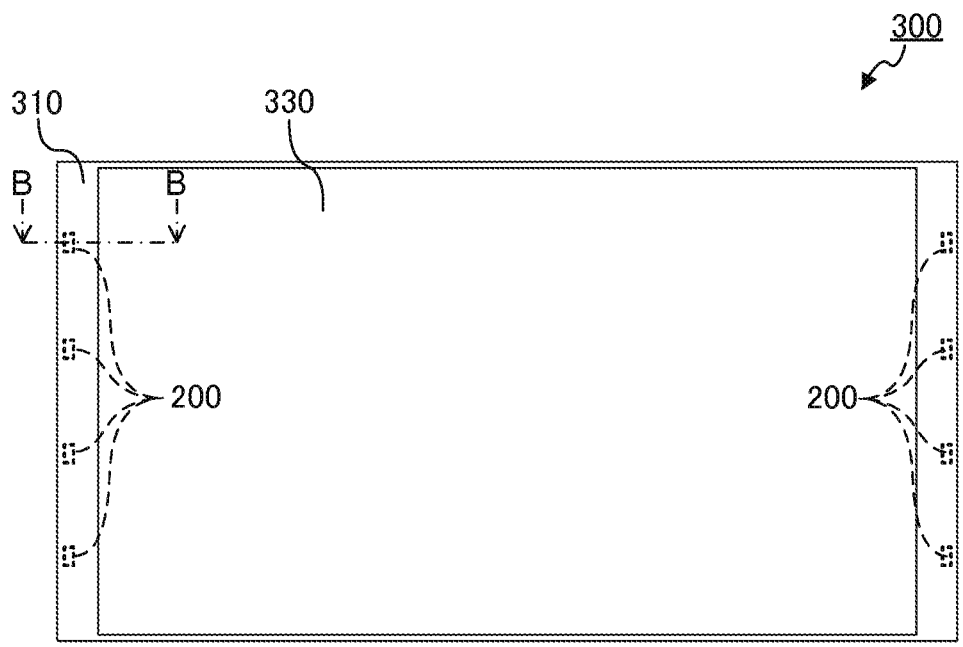
FIGS. 1A and 1B are drawings showing the configuration of the surface light source device of Embodiment 1.
Figure 1B:
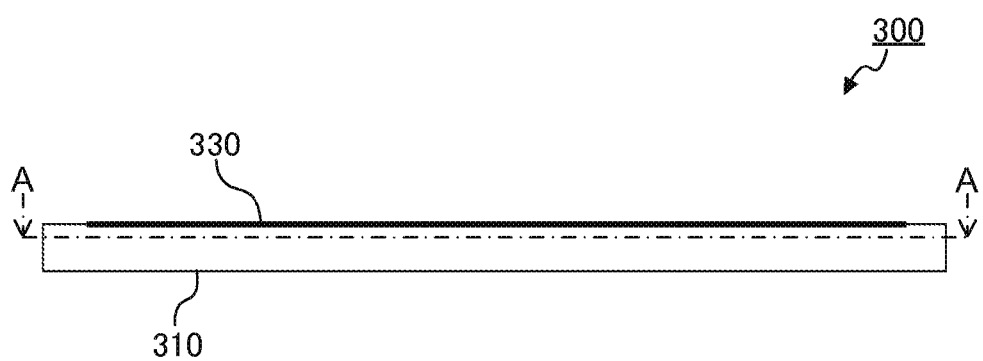
Figure 2A:
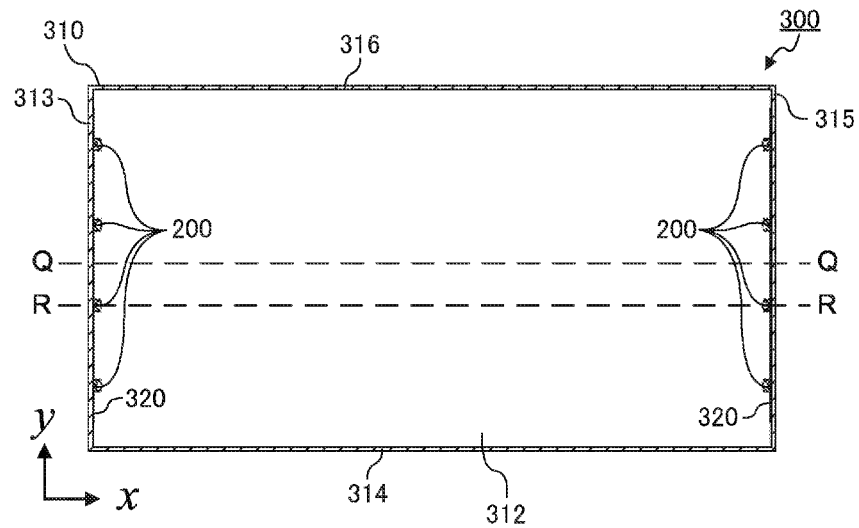
FIGS. 2A to 2C are drawings showing the configuration of the surface light source device of Embodiment 1.
Figure 2B:
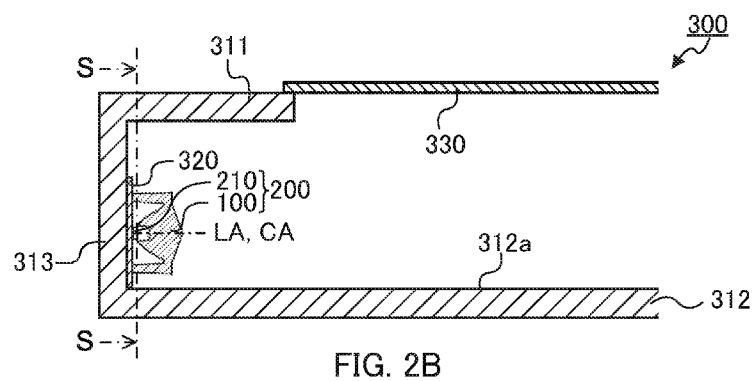
Figure 2C:
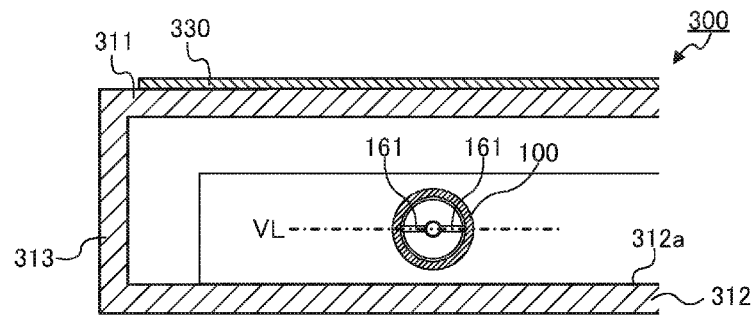

FIGS. 1A, 1B 2A, 2B and 2C are drawings showing the configuration of surface light source device 300 of Embodiment 1 of the present invention. FIG. 1A is a plan view of surface light source device 300, and FIG. 1B is a front view of surface light source device 300. FIG. 2A is a sectional view taken along line A-A illustrated in FIG. 1B, FIG. 2B is a partially enlarged sectional view taken along line B-B illustrated in FIG. 1A, and FIG. 2C is a sectional view taken along line S-S illustrated in FIG. 2B.

As illustrated in FIGS. 1 and 2, surface light source device 300 of embodiment 1 has housing 310, two substrates 320, a plurality of light emitting devices 200, and light-emitting planar member 330 as a member to be irradiated.

Housing 310 is a cuboid-shaped box for housing therein substrate 320 and a plurality of light emitting devices 200. Housing 310 is composed of top plate 311, bottom plate 312 facing top plate 311, and four side walls 313 to 316 that link top plate 311 and bottom plate 312. At the area constituting a light emitting surface of top plate 311, there is formed a rectangle-shaped opening that is covered with light-emitting planar member 330 (see FIG. 2B). Further, the internal surface of bottom plate 312 functions as diffusion and reflection surface 312a that diffuses and reflects light emitted from light emitting device 200 toward light-emitting planar member 330. Housing 310 is composed, for example, of resins such as polymethylmethacrylate (PMMA) and polycarbonate (PC), metals such as stainless steel and aluminum, or the like.

Two substrates 320 are rectangular flat plates for disposing a plurality of light emitting devices 200 at predetermined intervals. Two substrates 320 are respectively fixed to two side walls 313 and 315 facing each other (see FIG. 2A).

A plurality of light emitting devices 200 are aligned on each of two substrates 320 at predetermined intervals (see FIG. 2A). Each of a plurality of light emitting devices 200 has light emitting element 210 and light flux controlling member 100 (see FIG. 2B).

Light emitting element 210 is a light source of surface light source device 300 (and light emitting device 200), and is fixed on substrate 320. Light emitting element 210 is, for example, a light-emitting diode (LED) such as white light-emitting diode.

Light flux controlling member 100 controls the distribution of light emitted from light emitting element 210. Light flux controlling member 100 is disposed on light emitting element 210 such that its central axis CA coincides with optical axis LA of light emitting element 210 (see FIG. 2B). Here, "optical axis of light emitting element" means central light beam of emitted stereoscopic light flux from light emitting element 210. In addition, the side of light flux controlling member 100 facing light emitting element 210 is referred to as "back side," and the opposite side of the back side not facing light emitting element 210 is referred to as "front side." Further, the central axis of total reflection surface 120 is defined as "central axis of light flux controlling member."

Light flux controlling member 100 is positioned at an appropriate location on substrate 320. Further, while the detail will be described later, in light flux controlling member 100, there is formed a second emission part 160 having a pair of plate-like parts 161 that emit a part of light having entered light flux controlling member 100 to the outside, in such a manner as to be protruded from total reflection surface 120 (see FIG. 3C). The pair of plate-like parts 161 are disposed 180 degrees away from each other circumferentially around central axis CA of light flux controlling member 100.

Light flux controlling member 100 is formed by integral molding. The material for light flux controlling member 100 is not particularly limited as long as it can transmit light having a desired wavelength. Examples of the material for light flux controlling member 100 include light-transmissive resins such as polymethylmethacrylate (PMMA), polycarbonate (PC), and epoxy resin (EP), and glasses.

The surface light source device 300 of the present invention has a principal feature in the configuration of light flux controlling member 100. Thus, light flux controlling member 100 will be described in detail separately.

Light-emitting planar member 330 is a plate-like member having a light-diffusing property, and is disposed so as to cover an opening formed in top plate 311 of housing 310. Light-emitting planar member 330 is a member to be irradiated with light emitted from light emitting device 200. The internal surface (surface facing bottom plate 312) of light-emitting planar member 330 constitutes a surface to be irradiated with light emitted from light emitting device 200. Light-emitting planar member 330 transmits light emitted from light flux controlling member 100 and reflected light from diffusion and reflection surface 312a while diffusing them. Typically, light-emitting planar member 330 has roughly the same size as that of a liquid crystal panel, or the like. For example, light-emitting planar member 330 is formed of light-transmissive resins such as polymethylmethacrylate (PMMA), polycarbonate (PC), polystyrene (PS), or styrene/methyl methacrylate copolymer resin (MS). In order to impart a light diffusing property, light-emitting planar member 330 has fine irregularities formed on the surface thereof, or light-emitting planar member 330 has light diffusers such as beads dispersed therein.

In surface light source device 300 of the present embodiment, a plurality of light emitting devices 200 are disposed such that optical axis LA of light emitting element 210 is substantially parallel to light-emitting planar member 330. That is, a plurality of light emitting devices 200 are disposed such that, the larger the emission angle of light emitted from light emitting device 200 relative to optical axis LA of light emitting element 210 becomes, the smaller the incident angle to light-emitting planar member 330 becomes. A part of light emitted from each light emitting element 210 is concentrated in the direction of optical axis LA (light is distributed in a narrower angle) of each light emitting element 210 by light flux controlling member 100. Further, as shown in FIG. 2C, each of a plurality of light emitting devices 200 is disposed such that a virtual straight line VL orthogonal to central axis CA of light flux controlling member 100 and passing through the inside of a pair of plate-like parts 161 and light-emitting planar member 330 are substantially parallel to each other. As described later, a part of light having entered light flux controlling member 100 is not reflected at total reflection surface 120, but is emitted in the arrangement direction of light emitting devices 200 from second emission part 160. Light emitted from light flux controlling member 100 reaches the internal surface of light-emitting planar member 330 substantially uniformly directly or by being diffused and reflected at diffusion and reflection surface 312a. The light having reached the internal surface of light-emitting planar member 330 transmits through light-emitting planar member 330 while being further diffused by light-emitting planar member 330. As a result, in surface light source device 300 of the present invention, the brightness of the light emitting surface (external surface of light-emitting planar member 330) is uniformized (with less luminance unevenness).

(Configuration of Light Flux Controlling Member)

Next, the configuration of light flux controlling member 100 of the present embodiment will be explained.

Figure 3A:
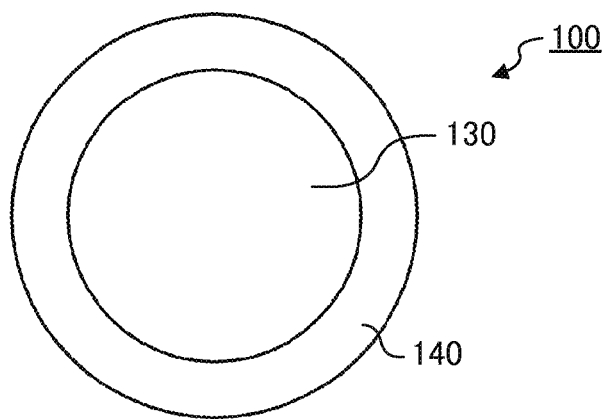
FIGS. 3A to 3C are drawings showing the configuration of the light flux controlling member of Embodiment 1.
Figure 3B:
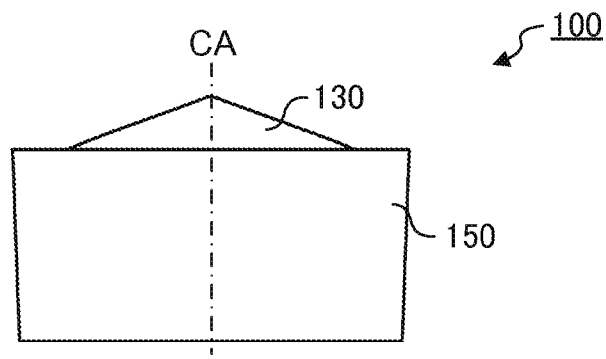
Figure 3C:
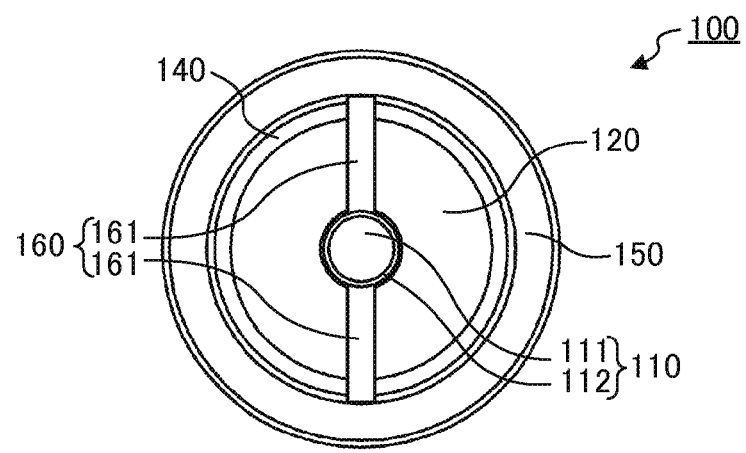
Figure 4A:
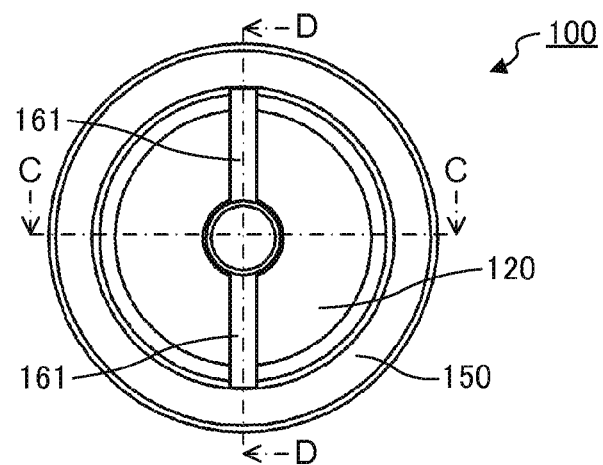
FIGS. 4A to 4C are drawings showing the configuration of the light flux controlling member of Embodiment 1.
Figure 4B:
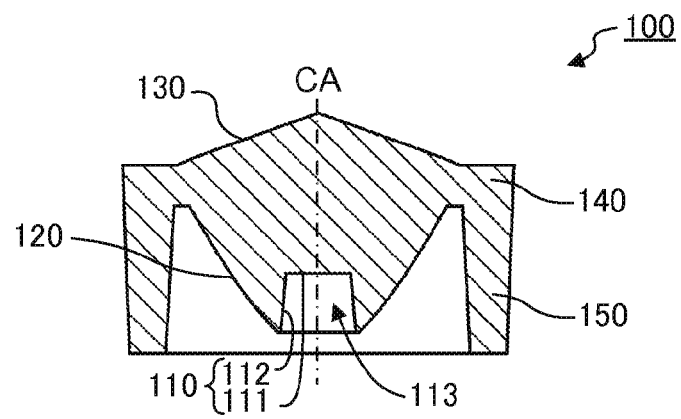
Figure 4C:
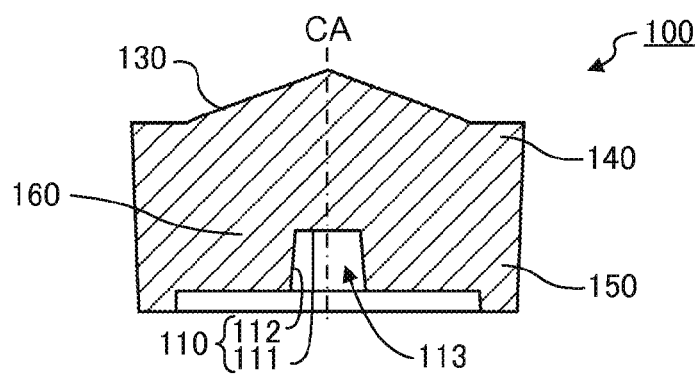

FIGS. 3 and 4 are drawings showing the configuration of light flux controlling member 100 of Embodiment 1 of the present invention. FIG. 3A is a plan view of light flux controlling member 100 of Embodiment 1, FIG. 3B is a side view of light flux controlling member 100 of Embodiment 1, and FIGS. 3C and 4A are bottom views of light flux controlling member 100 of Embodiment 1. FIG. 4B is a sectional view taken along line C-C illustrated in FIG. 4A, and FIG. 4C is a sectional view taken along line D-D illustrated in FIG. 4A.

As illustrated in FIGS. 3 and 4, light flux controlling member 100 has incident part 110, total reflection surface 120, first emission part 130, flange 140, holder 150, and second emission part 160.

Incident part 110 is an internal surface of recess 113 formed at the back side (light emitting element 210 side) of light flux controlling member 100 so as to intersect central axis CA (see FIGS. 4B and 4C). Incident part 110 is a rotationally symmetrical surface around central axis CA. Incident part 110 includes internal top surface 111 constituting the top surface of recess 113, and tapered internal side surface 112 constituting the side surface of recess 113.

Total reflection surface 120 reflects a part of light incident from incident part 110 toward first emission part 130 (front side). Total reflection surface 120 is a surface extending to the outer edge of first emission part 130 (more correctly, inner edge of flange 140) from the outer edge of the bottom part of light flux controlling member 100 (see FIG. 4B), and second emission part 160 is protruded from total reflection surface 120 (described later). Total reflection surface 120 is basically a rotationally symmetrical surface formed so as to surround central axis CA; however, total reflection surface 120 does not exist in an area where second emission part 160 is protruded. The diameter of total reflection surface 120 is gradually increased from incident part 110 side (back side) to first emission part 130 side (front side). The generatrix constituting total reflection surface 120 (total reflection surface 120 including central axis CA in the sectional view) is an arc-like curve that is convex toward the outside (side away from central axis CA) (see FIG. 4B).

First emission part 130 is a surface positioned at the opposite side (front side) of incident part 110 in light flux controlling member 100, and is formed so as to intersect central axis CA. First emission part 130 emits another part of light incident from incident part 110 (light that is incident from incident part 110 and directly reaches first emission part 130) and light reflected at total reflection surface 120 toward the outside. In light flux controlling member 100 of the present embodiment, first emission part 130 is a rotationally symmetrical surface around central axis CA, and the intersection with central axis CA is the highest point from the back side (see FIGS. 3B, 4B and 4C). The generatrix constituting first emission part 130 (first emission part 130 including central axis CA in the sectional view) is an arc-like curve that is convex toward the front side.

Flange 140 is a toric member formed so as to extend in a radial direction (direction orthogonal to central axis CA) of first emission part 130 from the outer edges of total reflection surface 120 and first emission part 130 (see FIG. 3A). In light flux controlling member 100 of the present embodiment, a light flux controlling member main body including incident part 110, total reflection surface 120 and first emission part 130 is joined with holder 150 via flange 140 (see FIG. 4B).

Holder 150 supports the light flux controlling member main body as well as positions the light flux controlling member main body with respect to substrate 320. Holder 150 is a substantially cylindrical member, and is formed in a forwardly tapered manner. Flange 140 is joined at the upper edge part of holder 150.

Second emission part 160 emits another part of light incident from incident part 110 (light that is incident from incident part 110 and reaches second emission part 160) toward the outside. More specifically, second emission part 160 emits a part of light at a larger angle relative to optical axis LA of light emitting element 210, among light emitted from incident part 110, toward the outside via holder 150 while maintaining the larger angle relative to optical axis LA of light emitting element 210, without allowing it to be reflected at total reflection surface 120. Second emission part 160 has one or two or more plate-like parts 161 extending in a radial direction from total reflection surface 120. According to the present embodiment, second emission part 160 has a pair of plate-like parts 161. A pair of plate-like parts 161 are disposed so as to fill the area between total reflection surface 120 and holder 150 in the cross-section including central axis CA (see FIG. 4C). Further, the lower edge of a pair of plate-like parts 161 is formed at the same height (direction orthogonal to central axis CA) as that of the opening of recess 113. One plate-like part 161 and the other plate-like part 161 are disposed 180 degrees away from each other circumferentially around central axis CA. That is, a pair of plate-like parts 161 are disposed on the same plane with central axis CA being disposed therebetween. Thereby, total reflection surface 120 is separated into two portions by a pair of plate-like parts 161 so as to be spaced away from each other by the thickness of plate-like part 161.

(Light Distribution Property of Light Flux Controlling Member)

A simulation was performed for the distribution of brightness on light-emitting planar member 330 of surface light source device 300 using light flux controlling member 100 of the present embodiment. As illustrated in FIGS. 1 and 2, by using surface light source device 300 in which four light emitting devices 200 having light flux controlling member 100 are fixed on each of two side walls 313 and 315 facing each other (hereinafter, referred to as "surface light source device of the present embodiment"), the illuminance of a surface to be measured disposed 0.5 mm away from light-emitting planar member 330 was measured. The surface to be measured is a virtual surface that is assumed to be illuminated by light having transmitted through light-emitting planar member 330, and the illuminance distribution to be obtained by the simulation is equivalent to the illuminance distribution on light-emitting planar member 330. In addition, in this simulation, light emitting device 200 (light flux controlling member 100) was disposed such that a pair of plate-like parts 161 became parallel to light-emitting planar member 330. For comparison, the similar simulation was performed also for a surface light source device having a light flux controlling member not having second emission part 160 (hereinafter, referred to as "surface light source device of comparative example"), instead of light flux controlling member 100 of the present embodiment.

Figure 5A:
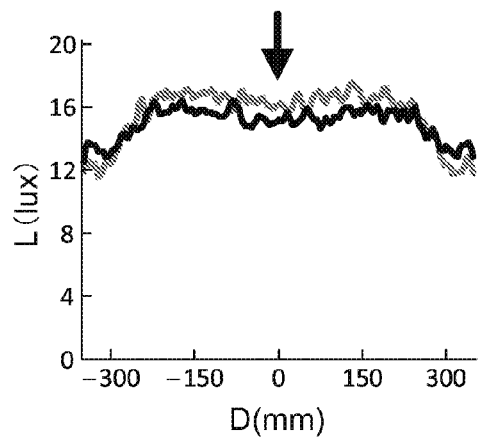
FIGS. 5A to 5D are graphs of simulation results using the light flux controlling member of Embodiment 1.
Figure 5B:
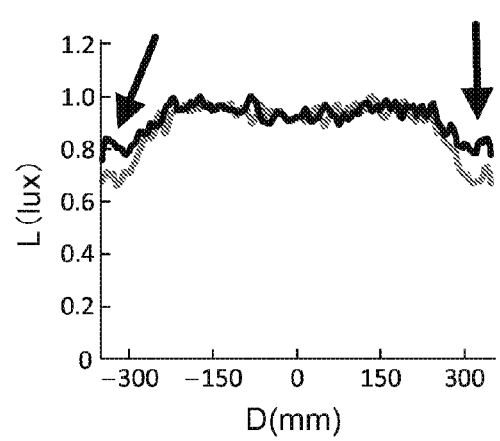
Figure 5C:
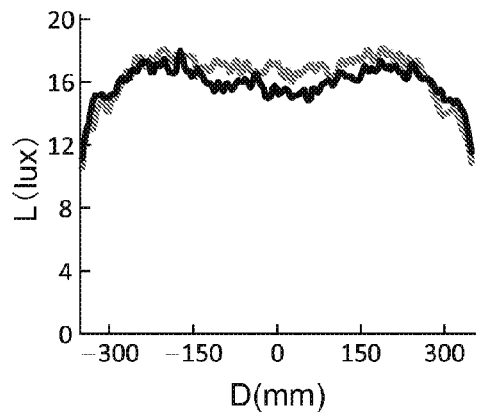
Figure 5D:
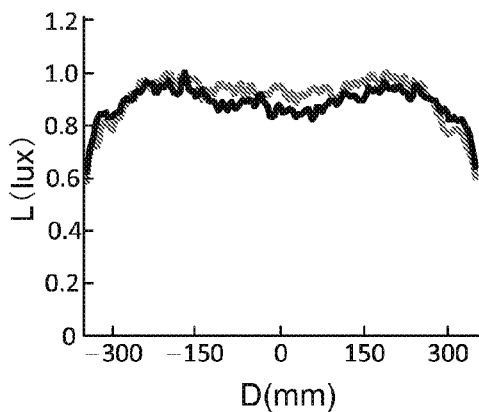

FIG. 5A is a graph showing the illuminance distribution on line Q-Q in FIG. 2A; FIG. 5B is a graph standardized with the maximum value being 1 in the illuminance distribution in FIG. 5A; FIG. 5C is a graph showing the illuminance distribution on line R-R in FIG. 2A; and FIG. 5D is a graph standardized with the maximum value being 1 in the illuminance distribution in FIG. 5C. In these graphs, a black line indicates the result of surface light source device 300 of the present embodiment, and a gray line indicates the result of the surface light source device of comparative example. In addition, in these graphs, the abscissa indicates the position of illumination apparatus 300 in the major axis direction (D; mm) at the time when the center in the major axis direction of illumination apparatus 300 is set to "0." The ordinate indicates illuminance (L; lux).

As illustrated in FIG. 5A, in surface light source device 300 of the present embodiment, the illuminance at the central portion between light sources was decreased compared to the surface light source device of the comparative example (see the arrow in FIG. 5A). Further, as illustrated in FIG. 5B, in surface light source device 300 of the present embodiment, the illuminance in areas between and in the vicinity of light sources were increased compared to the surface light source device of comparative example (see the arrow in FIG. 5B). This is because light that entered light flux controlling member 100 from incident part 110 is considered to have been emitted in the arrangement direction of light emitting elements 210 not only via first emission part 130, but also via second emission part 160 (a pair of plate-like parts 161). Further, as illustrated in FIGS. 5B and 5D, in surface light source device 300 of the present embodiment, illuminance contrast was weakened (luminance unevenness became smaller) compared to the surface light source device of comparative example.

(Effect)

As described above, light emitting device 200 having light flux controlling member 100 of the present embodiment emits light in a lateral direction not only from first emission part 130, but also from second emission part 160. Therefore, in surface light source device 300 of the present embodiment, a dark part hardly occurs in areas between light emitting devices 200 of light-emitting planar member 330. Accordingly, surface light source device 300 has less luminance unevenness.

Embodiment 2

A surface light source device and a light emitting device of Embodiment 2 of the present invention differ from surface light source device 300 and light emitting device 200 of Embodiment 1 in that they have light flux controlling member 500 of Embodiment 2 instead of light flux controlling member 100 of Embodiment 1. Thus, in the present embodiment, only light flux controlling member 500 of Embodiment 2 will be explained. It is noted that light flux controlling member 500 of Embodiment 2 differs from light flux controlling member 100 of Embodiment 1 only in the shape of first emission part 530. Thus, the same components as those of light flux controlling member 100 of Embodiment 1 are denoted by the same reference numerals, and the explanation thereof is omitted.

[Configuration of Light Flux Controlling Member]

Figure 6A:
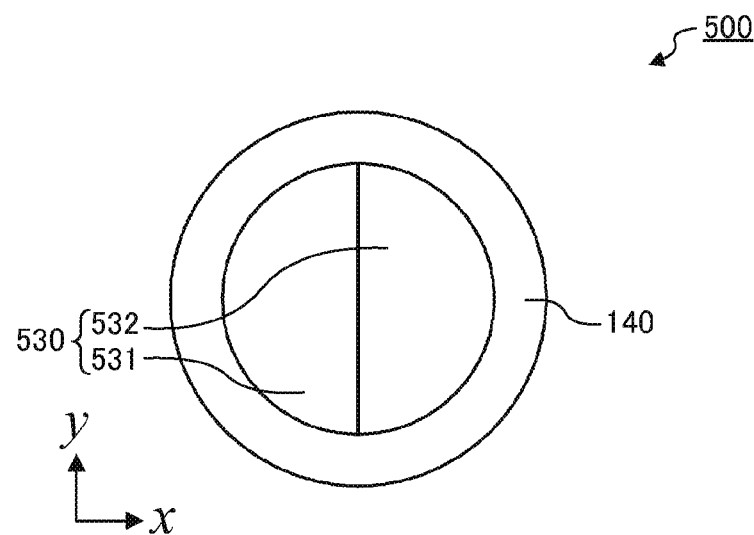
FIGS. 6A to 6C are drawings showing the configuration of the light flux controlling member of Embodiment 2.
Figures 6B, 6C:
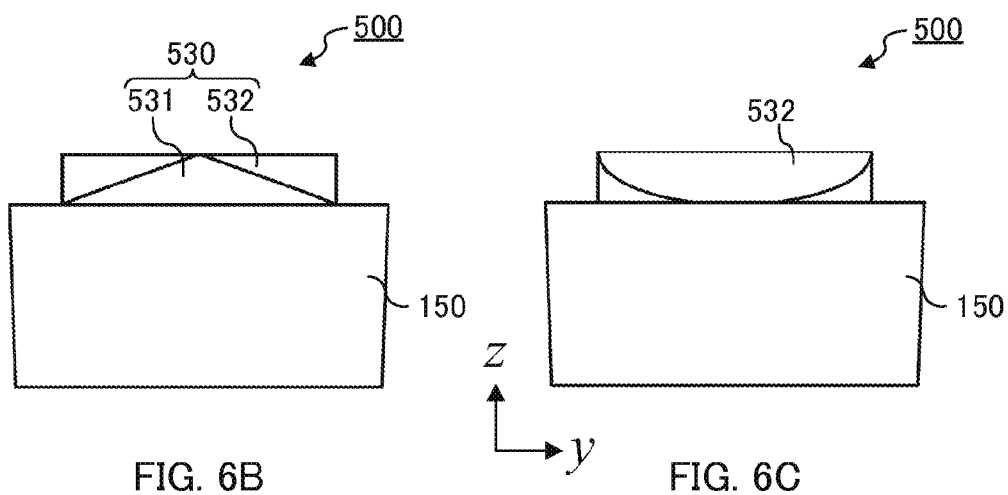

FIG. 6 is a drawing showing the configuration of light flux controlling member 500 of Embodiment 2. FIG. 6A is a plan view of light flux controlling member 500 of Embodiment 2; FIG. 6B is a left side view of light flux controlling member 500 of Embodiment 2; and FIG. 6C is a right side view of light flux controlling member 500 of Embodiment 2. In these drawings, the direction of the central axis of light flux controlling member 500 is set as z-axis direction, and two directions orthogonal to z-axis and orthogonal to each other are set as x-axis direction and y-axis direction. Light flux controlling member 500 is disposed such that yz-plane is substantially parallel to light-emitting planar member 330.

As illustrated in FIG. 6, light flux controlling member 500 of Embodiment 2 has incident part 110, total reflection surface 120, first emission part 530, flange 140, and holder 150. It is noted that, in FIG. 6, incident part 110 and total reflection surface 120 are not seen, as they are surrounded by holder 150.

In light flux controlling member 500 of Embodiment 2, the shape of first emission part 530 varies at a plane, as a boundary, passing through central axis CA and being parallel to yz-plane, and first emission part 530 has first emission surface 531 and second emission surface 532. First emission surface 531 is a part of a rotationally symmetrical surface around central axis CA, and the intersection with central axis CA is the highest point from the back side (see FIG. 6B). The generatrix (first emission part 531 in the sectional view including central axis CA) constituting first emission part 531 is an arc-like curve that is convex toward the front side. Second emission part 532 has a substantially cylindrical shape having a curvature in x-axis direction but not having a curvature in y-axis direction (see FIG. 6C). Accordingly, second emission part 532 collects light in x-axis direction, but expands and emits light in y-axis direction. Light flux controlling member 500 is disposed such that yz-plane is substantially parallel to light-emitting planar member 330, and that second emission surface 532 is at the side of light-emitting planar member 330.

[Effect]

In light flux controlling member 500 of the present embodiment, in addition to the effects similar to those of light flux controlling member 100 of Embodiment 1, first emission surface 531 is capable of concentrating light in x-axis direction and y-axis direction, and second emission surface 532 is capable of concentrating light only in x-axis direction and expanding light in y-axis direction. Accordingly, a surface light source device including light flux controlling member 500 is capable of allowing light to reach farther while suppressing the occurrence of a dark part in an area between two light flux controlling members 500 of the light emitting surface so as to reduce luminance unevenness of the light emitting surface.

Embodiment 3

A surface light source device and a light emitting device of Embodiment 3 of the present invention differ from surface light source device 300 and light emitting device 200 of Embodiment 1 in that they have light flux controlling member 600 of Embodiment 3 instead of light flux controlling member 100 of Embodiment 1. Thus, in the present embodiment, only light flux controlling member 600 of Embodiment 3 will be explained. It is noted that light flux controlling member 600 of Embodiment 3 differs from light flux controlling member 100 of Embodiment 1 only in the shape of second emission part 660. Thus, the same components as those of light flux controlling member 100 of Embodiment 1 are denoted by the same reference numerals, and the explanation thereof is omitted.

(Configuration of Light Flux Controlling Member)

Figure 7A:
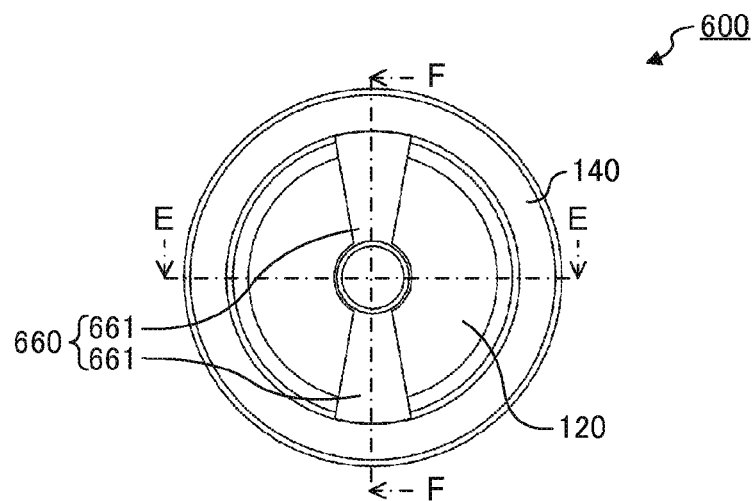
FIGS. 7A to 7C are drawings showing the configuration of the light flux controlling member of Embodiment 3.
Figures 7B, 7C:
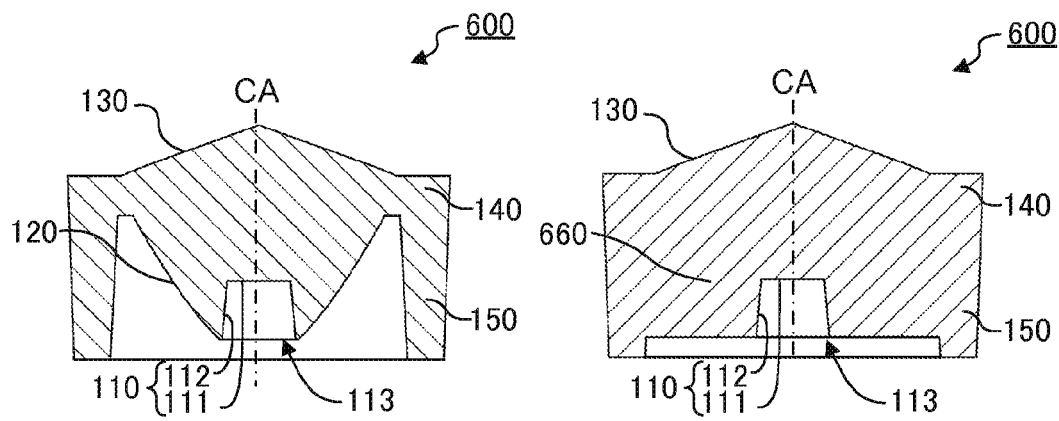
Figure 8A:
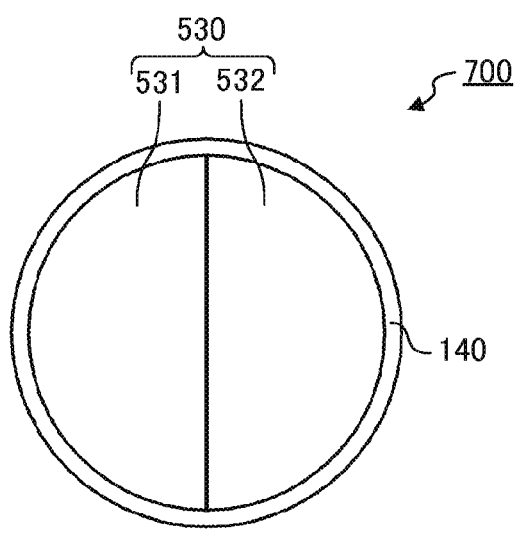
FIGS. 8A to 8D are drawings showing the configuration of the light flux controlling member of Embodiment 4.
Figure 8B:
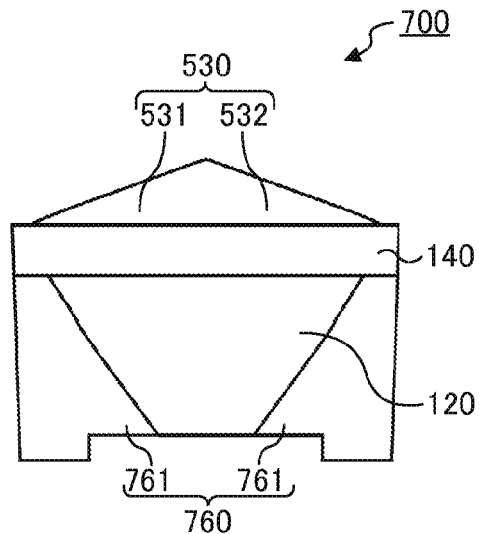
Figure 8C:
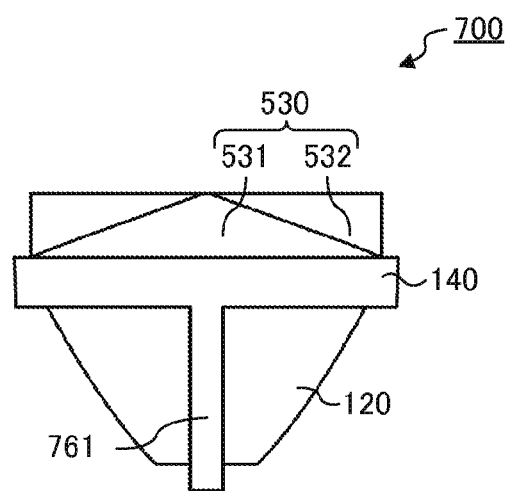
Figure 8D:
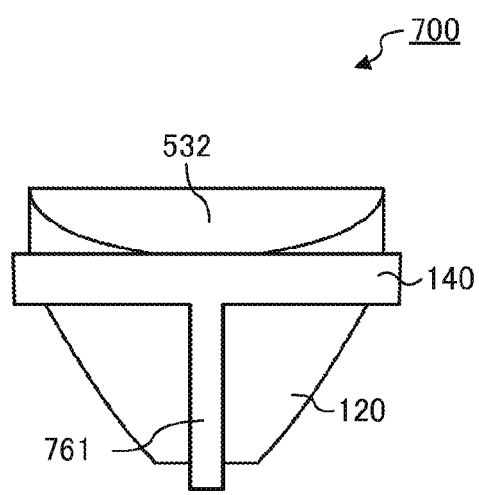

FIG. 7A is a bottom view of light flux controlling member 600 of Embodiment 3; FIG. 7B is a sectional view taken along line E-E illustrated in FIG. 7A; and FIG. 7C is a sectional view taken along line F-F illustrated in FIG. 7A As illustrated in FIG. 7, light flux controlling member 600 of Embodiment 3 has incident part 110, total reflection surface 120, first emission part 130, flange 140, holder 150, and second emission part 660.

In light flux controlling member 600 of Embodiment 3, second emission part 660 has a pair of plate-like parts 661 extending in a radial direction from total reflection surface 120. A pair of plate-like parts 661 are disposed so as to fill the area between total reflection surface 120 and holder 150 in the cross-section including central axis CA (see FIG. 7C). Further, the lower edge of a pair of plate-like parts 661 is formed at the same height as that of the opening of recess 113. One plate-like part 661 and the other plate-like part 661 are disposed 180 degrees away from each other circumferentially around central axis CA. A pair of plate-like parts 661 are formed such that the thickness of the plate becomes gradually larger toward the outer edge part from central axis CA in the cross-section orthogonal to central axis CA.

[Effect]

Light flux controlling member 600 of the present embodiment has effects similar to those of light flux controlling member 100 of Embodiment 1. By forming plate-like parts 661 such that the width of an area on total reflection surface 120 at which second emission part 660 is protruded varies depending on the height of light flux controlling member 600 from the back side, it becomes possible to appropriately adjust the distribution between light for controlling the occurrence of a dark part in an area between two light flux controlling members 600 of the light emitting surface and light for reaching farther.

Embodiment 4

A surface light source device and a light emitting device of Embodiment 4 of the present invention differ from surface light source device 300 and light emitting device 200 of Embodiment 1 in that they have light flux controlling member 700 of Embodiment 4 instead of light flux controlling member 100 of Embodiment 1. Thus, in the present embodiment, only light flux controlling member 700 of Embodiment 4 will be explained. It is noted that light flux controlling member 700 of Embodiment 4 differs from light flux controlling member 500 of Embodiment 2 only in the presence/absence of holder 150 and the shape of second emission part 760. Thus, the same components as those of light flux controlling member 500 of Embodiment 2 are denoted by the same reference numerals, and the explanation thereof is omitted.

(Configuration of Light Flux Controlling Member)

Figure 9A:
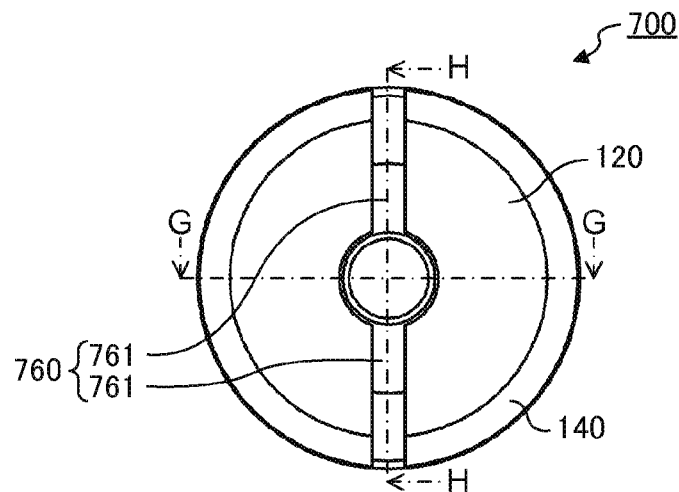
FIGS. 9A to 9C are drawings showing the configuration of the light flux controlling member of Embodiment 4.
Figures 9B, 9C:
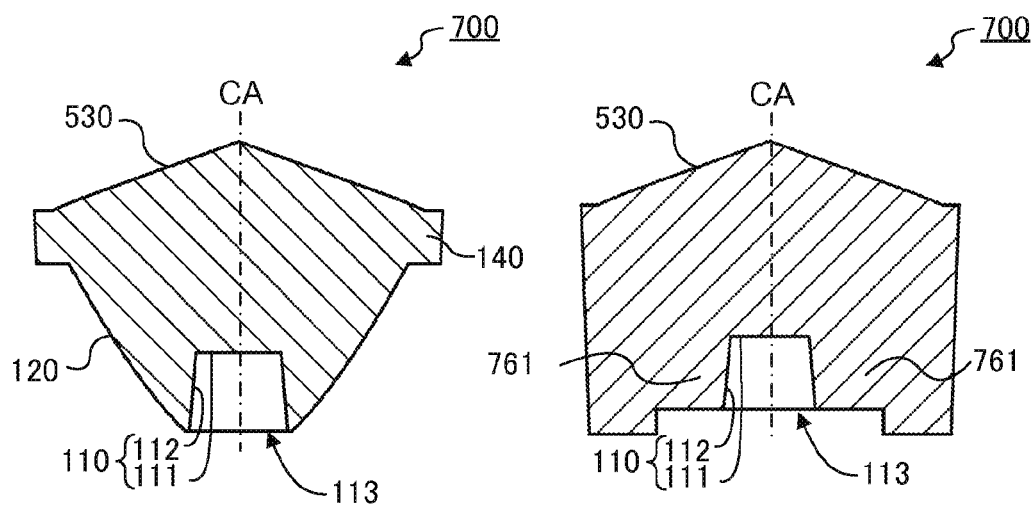
Figure 10A:
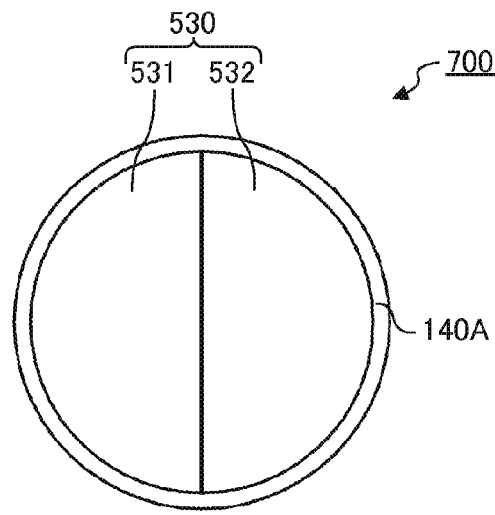
FIGS. 10A to 10D are drawings showing the configuration of the light flux controlling member of a modification of Embodiment 4.
Figure 10B:
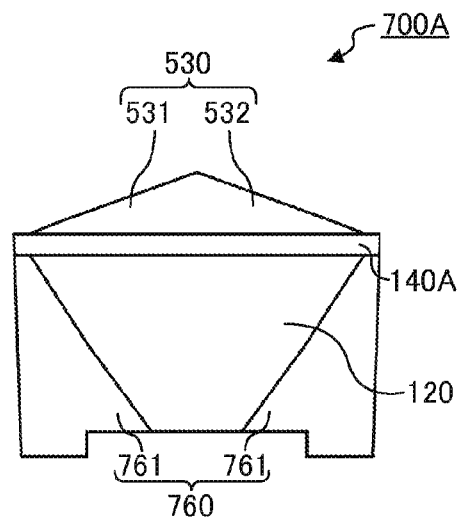
Figure 10C:
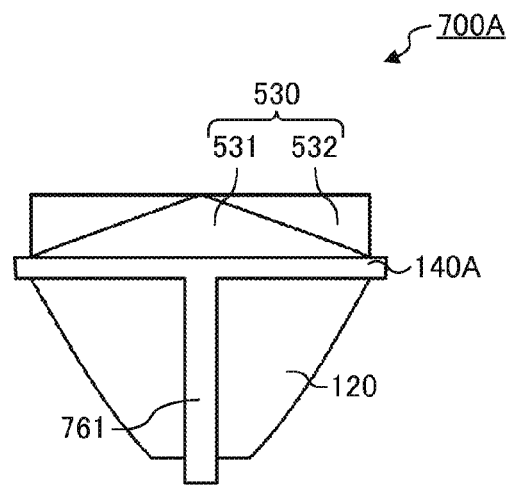
Figure 10D:
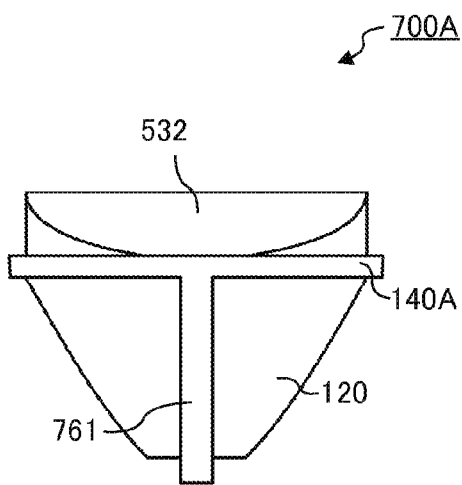

FIGS. 8 and 9 are drawings showing the configuration of light flux controlling member 700 of Embodiment 4. FIG. 8A is a plan view of light flux controlling member 700 of Embodiment 4; FIG. 8B is a front view of light flux controlling member 700 of Embodiment 4; FIG. 8C is a left side view of light flux controlling member 700 of Embodiment 4; and FIG. 8D is a right side view of light flux controlling member 700 of Embodiment 4. FIG. 9A is a bottom view of light flux controlling member 700 of Embodiment 4; FIG. 9B is a sectional view taken along line G-G illustrated in FIG. 9A; and FIG. 9C is a sectional view taken along line H-H illustrated in FIG. 9A.

As illustrated in FIGS. 8 and 9, light flux controlling member 700 of Embodiment 4 has incident part 110, total reflection surface 120, first emission part 530, and second emission part 760.

In light flux controlling member 700 of Embodiment 4, second emission part 760 has a pair of plate-like parts 761 extending in a radial direction from total reflection surface 120. A pair of plate-like parts 761 are disposed 180 degrees away from each other around central axis CA. Further, the outer edges of a pair of plate-like parts 761 reach as far as the side surface of flange 140.

[Effect]

In addition to effects similar to those of light flux controlling member 100 of Embodiment 1, light flux controlling member 700 of the present embodiment can be manufactured at lower costs, since no holder 150 is formed.

Further, in light flux controlling member 700 of the present embodiment, flange 140 can be thinner, since no holder 150 is formed. That is, when a light flux controlling member 100 of Embodiment 1 having holder 150 is integrally molded, it is necessary to make flange 140 thicker to some degree in order to supply resin to holder 150, whereas, in light flux controlling member 700 of the present embodiment not having holder 150, flange 140 can be thinner, since no resin is supplied to holder 150. Accordingly, as illustrated in FIGS. 10 (plan view), 10B (front view), 10C (left side view), and 10D (right side view), in light flux controlling member 700A of the present embodiment, flange 140A may be thinner. With this configuration, total reflection surface 120 can be larger, allowing light to be irradiated farther.

Embodiment 5

A surface light source device and a light emitting device of Embodiment 5 of the present invention differ from surface light source device 300 and light emitting device 200 of Embodiment 1 in that they have light flux controlling member 800 of Embodiment 5 instead of light flux controlling member 100 of Embodiment 1. Thus, in the present embodiment, only light flux controlling member 800 of Embodiment 5 will be explained. It is noted that light flux controlling member 800 of Embodiment 5 differs from light flux controlling member 500 of Embodiment 2 only in the shape and/or position of second emission part 860. Thus, the same components as those of light flux controlling member 500 of Embodiment 2 are denoted by the same reference numerals, and the explanation thereof is omitted.

(Configuration of Light Flux Controlling Member)

Figure 11A:
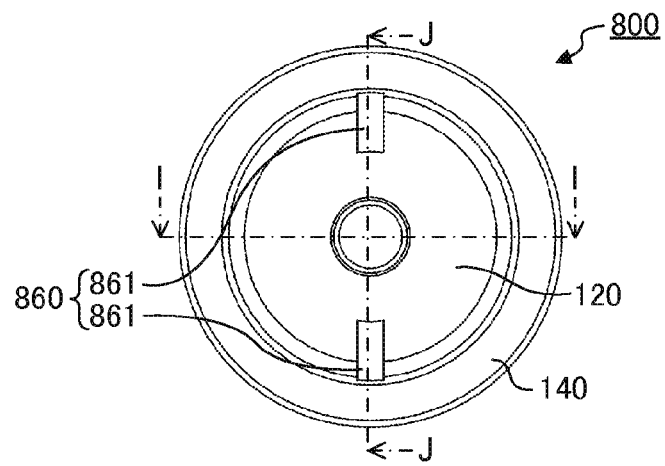
FIGS. 11A to 11C are drawings showing the configuration of the light flux controlling member of Embodiment 5.
Figures 11B, 11C:
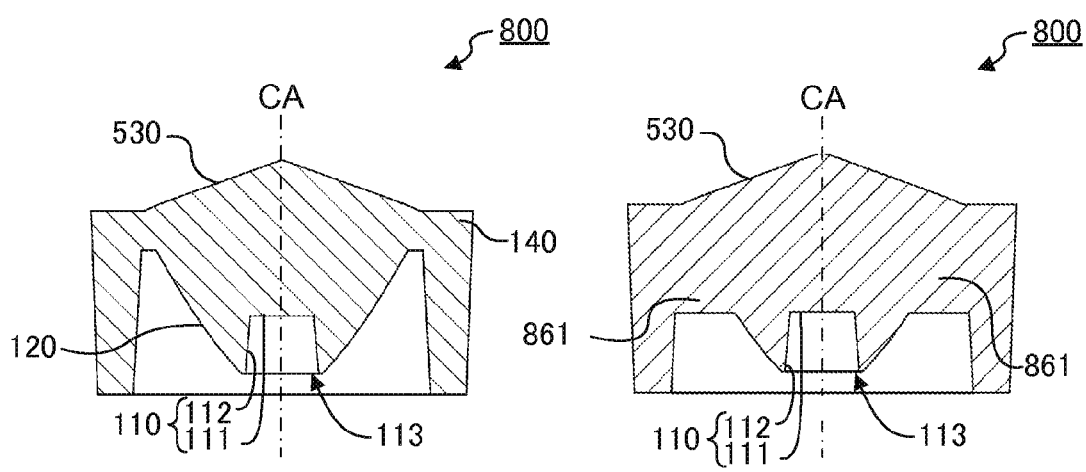

FIG. 11 is a drawing showing the configuration of light flux controlling member 800 of Embodiment 5. FIG. 11A is a bottom view of light flux controlling member 800 of Embodiment 5; FIG. 11B is a sectional view taken along line I-I illustrated in FIG. 11A; and FIG. 11C is a sectional view taken along line J-J illustrated in FIG. 11A.

As illustrated in FIG. 11, light flux controlling member 800 of Embodiment 5 has incident part 110, total reflection surface 120, first emission part 130, holder 150, and second emission part 860.

In light flux controlling member 800 of Embodiment 5, second emission part 860 has a pair of plate-like parts 861 extending in a radial direction from total reflection surface 120. A pair of plate-like parts 861 are disposed so as to fill the area between total reflection surface 120 and holder 150 in the cross-section including central axis CA (see FIG. 11C). Further, the lower edge of a pair of plate-like parts 861 is half the height of total reflection surface 120 (the same height of internal top surface 111) in the cross-section including central axis CA. Further, one plate-like part 861 and the other plate-like part 861 are disposed 180 degrees away from each other circumferentially around central axis CA.

Further, the shape and position of second emission part 860 are not limited to the mode illustrated in FIG. 11. For example, as illustrated in FIG. 12A (bottom view), 12B (sectional view taken along line K-K), and 12C (sectional view taken along line L-L), in light flux controlling member 800A of Embodiment 5, second emission part 860A may be formed only in the vicinity of incident part 110. In this example, second emission part 860A has a pair of plate-like parts 861A. The lower edge of a pair of plate-like parts 861A is formed at the same height as the opening of recess 113, and the upper edge part of a pair of plate-like parts 861A reaches half the height of total reflection surface 120 in the cross-section including central axis CA.

(Effect)

Light flux controlling members 800 and 800A of the present embodiment have effects similar to those of light flux controlling member 100 of Embodiment 1. Further, with the position at which second emission part 860 is protruded, and with the shape of the connection area between second emission part 860 and total refection surface 120, it becomes possible to appropriately adjust the distribution between light for controlling the occurrence of a dark part in an area between two light flux controlling members 800 of the light emitting surface and light for reaching farther.

Embodiment 6

A surface light source device and a light emitting device of Embodiment 6 of the present invention differ from surface light source device 300 and light emitting device 200 of Embodiment 1 in that they have light flux controlling member 900 of Embodiment 6 instead of light flux controlling member 100 of Embodiment 1. Thus, in the present embodiment, only light flux controlling member 900 of Embodiment 6 will be explained. It is noted that light flux controlling member 900 of Embodiment 6 differs from light flux controlling member 500 of Embodiment 2 only in the shapes of flange 940 and holder 950. Thus, the same components as those of light flux controlling member 500 of Embodiment 2 are denoted by the same reference numerals, and the explanation thereof is omitted.

(Configuration of Light Flux Controlling Member)

Figure 13A:
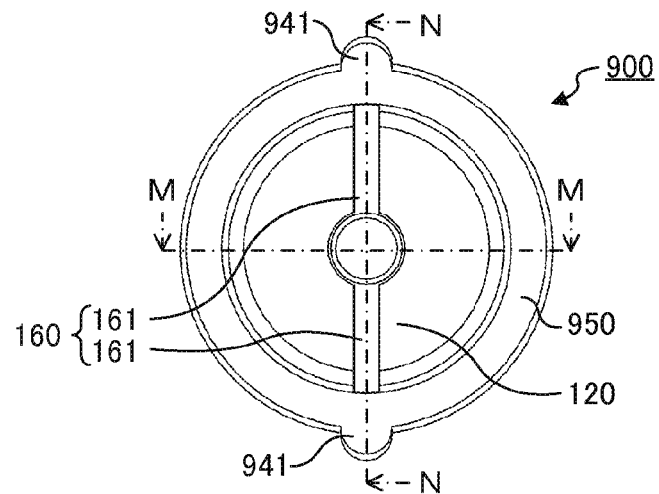
FIGS. 13A to 13C are drawings showing the configuration of the light flux controlling member of Embodiment 6.
Figures 13B, 13C:
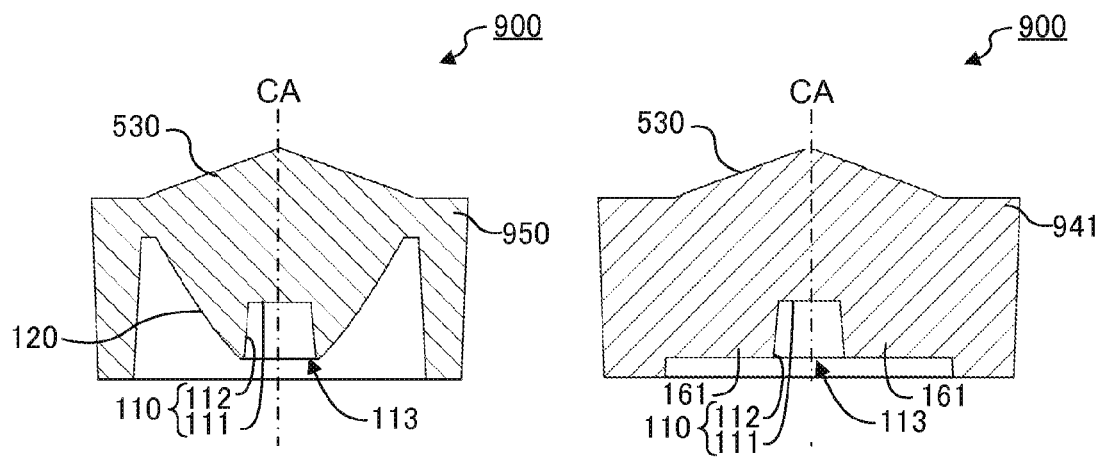

FIG. 13 is a drawing showing the configuration of light flux controlling member 900 of Embodiment 6. FIG. 13A is a bottom view of light flux controlling member 900 of Embodiment 6; FIG. 13B is a sectional view taken along line M-M illustrated in FIG. 13A; and FIG. 13C is a sectional view taken along line N-N illustrated in FIG. 13A.

As illustrated in FIG. 13, light flux controlling member 900 of Embodiment 6 has incident part 110, total reflection surface 120, first emission part 530, flange 940, holder 950, and second emission part 160.

At the side surfaces of flange 940 and holder 950 in light flux controlling member 900 of Embodiment 6, there are formed a pair of linear protrusions 941. A pair of linear protrusions 941 are disposed 180 degrees away from each other circumferentially around central axis CA. Further, a pair of linear protrusions 941 are disposed in the same direction as the extending direction of a pair of plate-like parts 161 from central axis CA. A pair of linear protrusions 941 are formed such that the sectional shape orthogonal to central axis CA is a semicircular shape, and emit light having been propagated inside plate-like part 161 toward the outside while concentrating it.

(Effect)

Light flux controlling member 900 of the present embodiment has effects similar to those of light flux controlling member 100 of Embodiment 1. Further, since a pair of plate-like parts 161 and a pair of linear protrusions 941 having a semicircular sectional shape are disposed in the same direction, light having been propagated inside a pair of plate-like parts 161 can be emitted toward the outside while concentrating it.

Embodiment 7

A surface light source device and a light emitting device of Embodiment 7 of the present invention differ from surface light source device 300 and light emitting device 200 of Embodiment 1 in that they have light flux controlling member 1000 of Embodiment 7 instead of light flux controlling member 100 of Embodiment 1. Thus, in the present embodiment, only light flux controlling member 1000 of Embodiment 7 will be explained.

(Configuration of Light Flux Controlling Member)

Figure 14A:
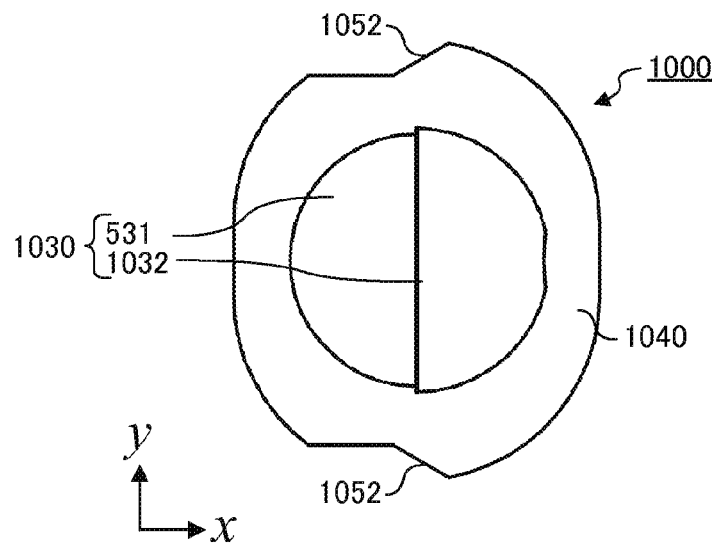
FIGS. 14A to 14C are drawings showing the configuration of the light flux controlling member of Embodiment 7.
Figures 14B, 14C:
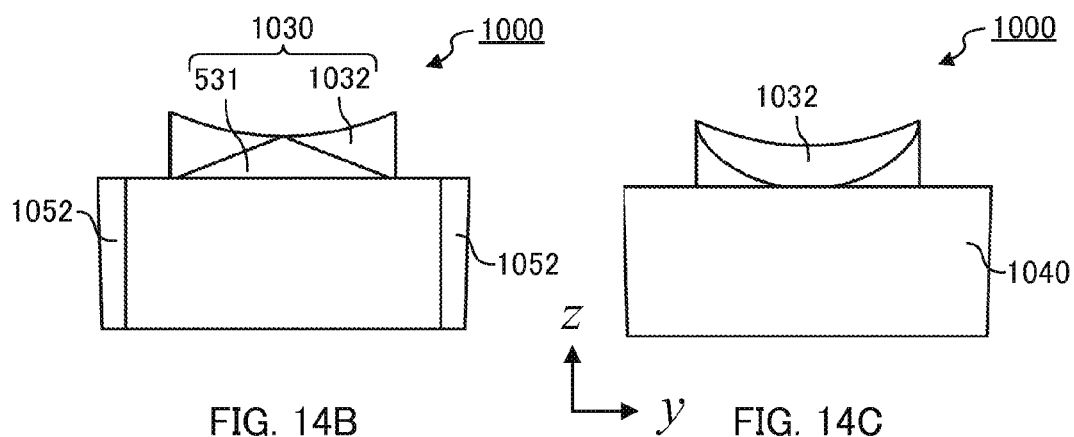
Figure 15A:
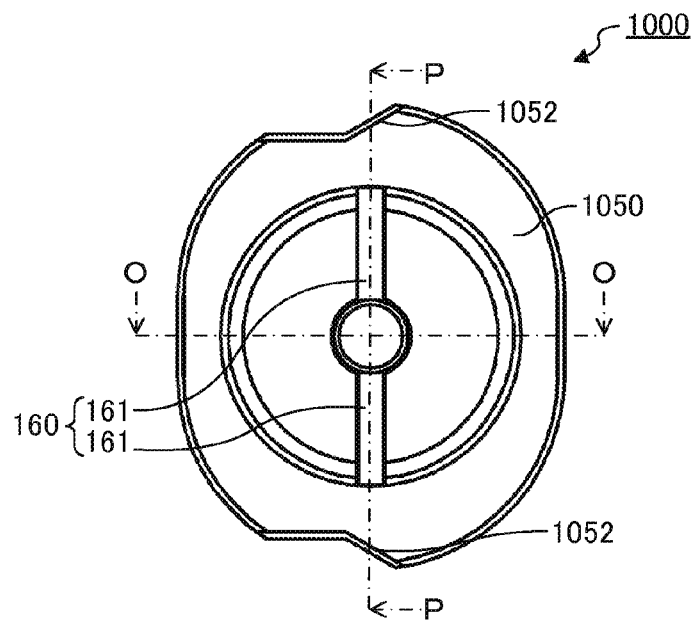
FIGS. 15A to 15C are drawings showing the configuration of the light flux controlling member of Embodiment 7.
Figures 15B, 15C:
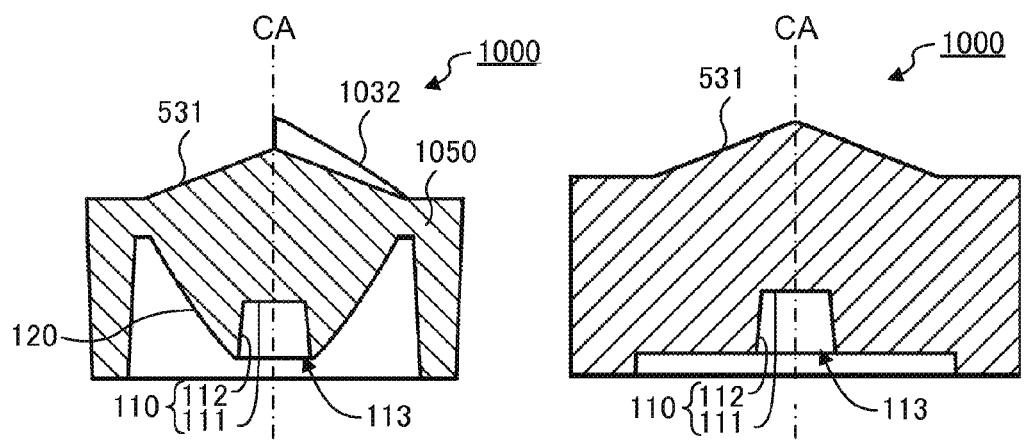

FIGS. 14 and 15 are drawings showing the configuration of light flux controlling member 1000 of Embodiment 7. FIG. 14A is a plan view of light flux controlling member 1000 of Embodiment 7; FIG. 14B is a left side view of light flux controlling member 1000 of Embodiment 7; and FIG. 14C is a right side view of light flux controlling member 1000 of Embodiment 7. FIG. 15A is a bottom view of light flux controlling member 1000 of Embodiment 7; FIG. 15B is a sectional view taken along line O-O illustrated in FIG. 15A; and FIG. 15C is a sectional view taken along line P-P illustrated in FIG. 15A. In these drawings, the direction of the central axis of light flux controlling member 1000 is set as z-axis direction, and two directions orthogonal to z-axis and orthogonal to each other are set as x-axis direction and y-axis direction. Light flux controlling member 1000 is disposed such that yz-plane is substantially parallel to light-emitting planar member 330.

As illustrated in FIGS. 14 and 15, light flux controlling member 1000 of Embodiment 7 has incident part 110, total reflection surface 120, first emission part 1030, flange 1040, holder 1050, and second emission part 860. In light flux controlling member 1000 of Embodiment 7, the shapes of first emission part 1030, flange 1040 and holder 1050 differ from those of light flux controlling member 100 of Embodiment 1. Thus, the shapes of first emission part 1030, flange 1040 and holder 1050 will be explained with reference to FIGS. 14 and 15. It is noted that the same components as those of light flux controlling member 100 of Embodiment 1 are denoted by the same reference numerals, and the explanation thereof is omitted.

In light flux controlling member 1000 of Embodiment 7, first emission part 1030 has first emission surface 531 and second emission surface 1032. Second emission surface 1032 has a saddle-like shape, and has a curvature for each of x-axis direction and y-axis direction. The curvature center in x-axis direction lies below second emission surface 1032, and the curvature center in y-axis direction lies above second emission surface 1032.

Further, in light flux controlling member 1000 of Embodiment 7, at the sides of flange 1040 and holder 150, there are formed a pair of linear recess parts 1052. A pair of linear recess parts 1052 are disposed 180 degrees away from each other circumferentially around central axis CA. Further, a pair of linear recess parts 1052 are disposed in the same direction as the extending direction of a pair of plate-like parts 161 from central axis CA. A pair of linear recess parts 1052 are formed such that one plane is inclined at a predetermined angle relative to xz-plane, allowing light having been propagated inside plate-like part 161 to be emitted toward the outside while refracting it in a predetermined direction.

Figure 16A:
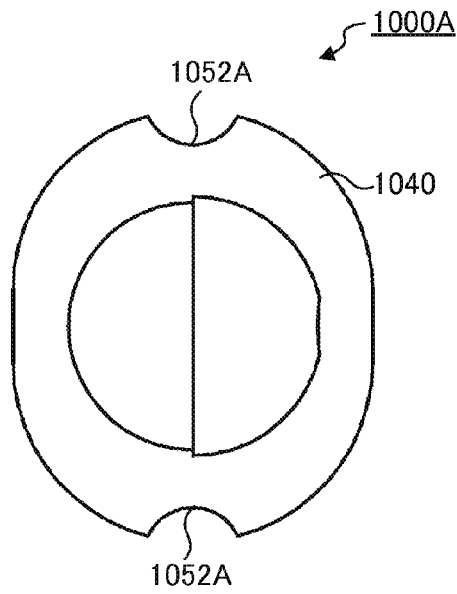
FIGS. 16A to 16D are drawings showing the configuration of the light flux controlling member of a modification of Embodiment 7.
Figure 16B:
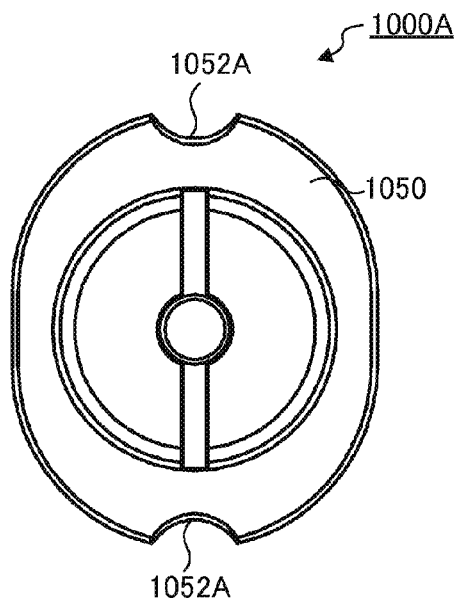

It is noted that the shape of linear recess part 1052 is not limited to the modes illustrated in FIGS. 14 and 15. For example, as illustrated in FIGS. 16A (plan view) and 16B (bottom view), in light flux controlling member 1000A of Embodiment 7, linear recess part 1052A may have a sectional shape orthogonal to central axis CA being semicircular. In this case, light having been propagated inside plate-like part 161 is emitted toward the outside while being expanded in recess part 1052.

Figure 16C:
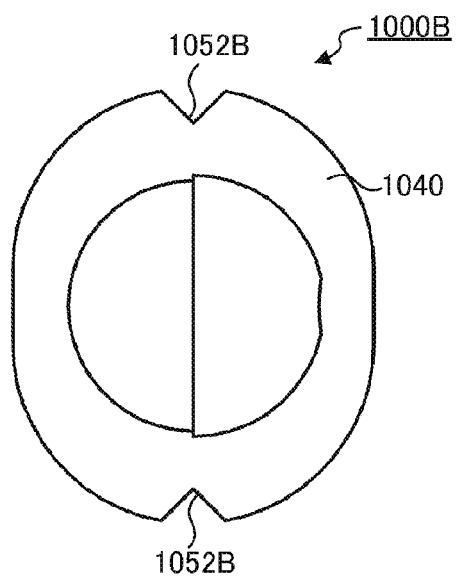
Figure 16D:
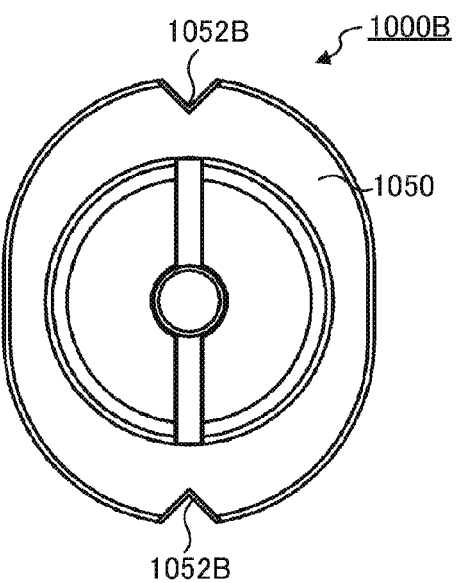

Further, as illustrated in FIGS. 16C (plan view) and 16D (bottom view), in light flux controlling member 1000B of Embodiment 7, recess part 1052B may have a sectional shape orthogonal to central axis CA being triangular. In this case, light having been propagated inside plate-like part 161 is reflected at any plane of recess part 1052 and is emitted toward the outside from the side surface of holder 1050.

[Effect]

In addition to the effects similar to those of light flux controlling member 100 of Embodiment 1, light flux controlling members 1000, 1000A, and 1000B of the present embodiment are capable of emitting light having been propagated inside a pair of plate-like parts 161 toward the outside while distributing the light in a specific direction.

Embodiment 8

A surface light source device and a light emitting device of Embodiment 8 of the present invention differ from surface light source device 300 and light emitting device 200 of Embodiment 1 in that they have light flux controlling member 1100 of Embodiment 8 instead of light flux controlling member 100 of Embodiment 1. Thus, in the present embodiment, only light flux controlling member 1100 of Embodiment 8 will be explained. It is noted that light flux controlling member 1100 of Embodiment 8 differs from light flux controlling member 1000 of Embodiment 7 only in the shape of flange 1140 and the position of second emission part 160. Thus, the same components as those of light flux controlling member 1000 of Embodiment 7 are denoted by the same reference numerals, and the explanation thereof is omitted.

(Configuration of Light Flux Controlling Member)

Figure 17A:
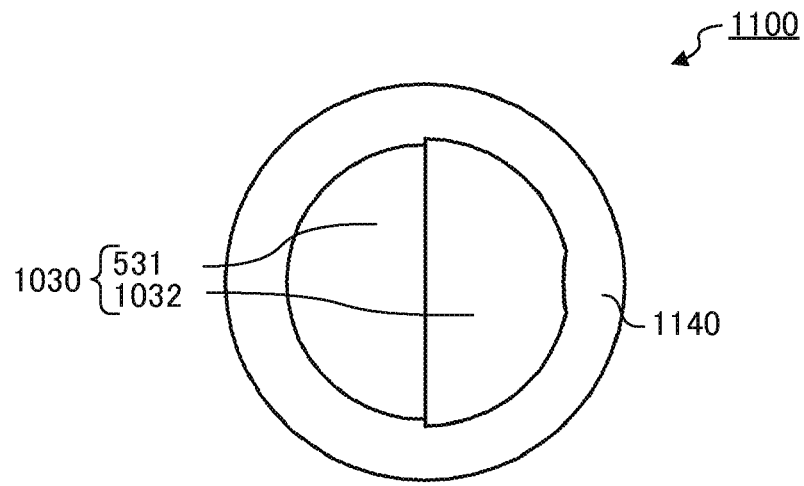
FIGS. 17A and 17B are drawings showing the configuration of the light flux controlling member of Embodiment 8.
Figure 17B:
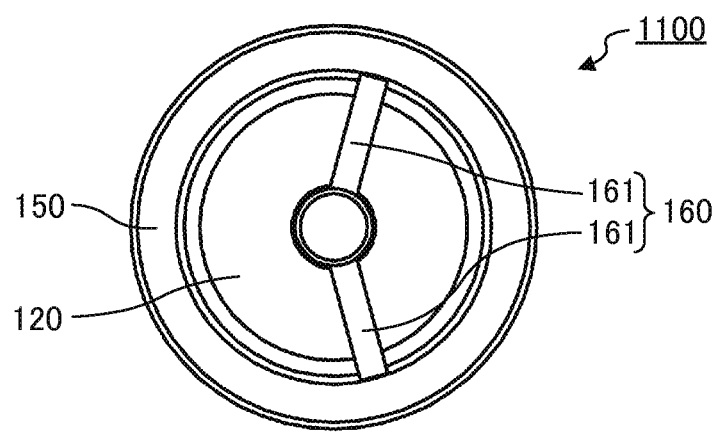

FIG. 17 is a drawing showing the configuration of light flux controlling member 1100 of Embodiment 8. FIG. 17A is a plan view of light flux controlling member 1100 of Embodiment 8; and FIG. 17B is a bottom view of light flux controlling member 1100 of Embodiment 8.

As illustrated in FIG. 17, light flux controlling member 1100 of Embodiment 8 has incident part 110, total reflection surface 120, first emission part 1030, flange 1140, holder 150, and second emission part 160.

In light flux controlling member 1100 of Embodiment 8, flange 140 is formed in a substantially circular shape, when viewed in plane. Further, second emission part 160 has a pair of plate-like parts 161. One plate-like part 161 and the other plate-like part 161 are disposed 150 degrees away from each other circumferentially around central axis CA (see FIG. 17B).

Figure 18A:
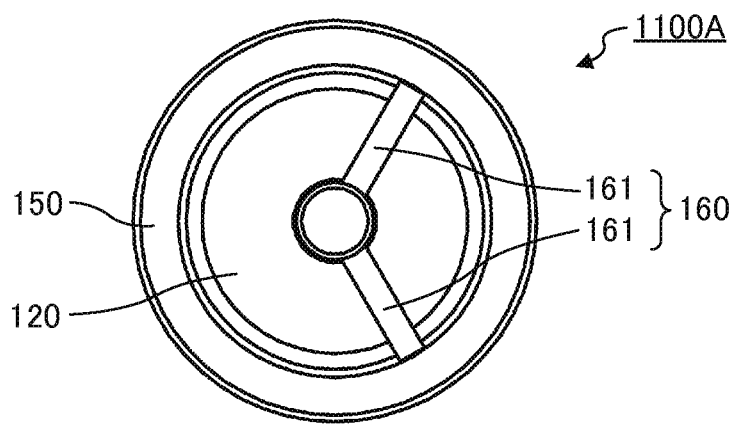
FIGS. 18A to 18C are drawings showing the configuration of the light flux controlling member of a modification of Embodiment 8.
Figure 18B:
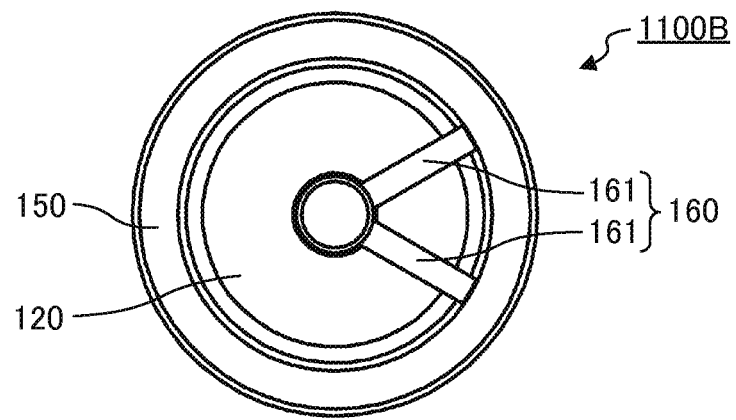
Figure 18C:
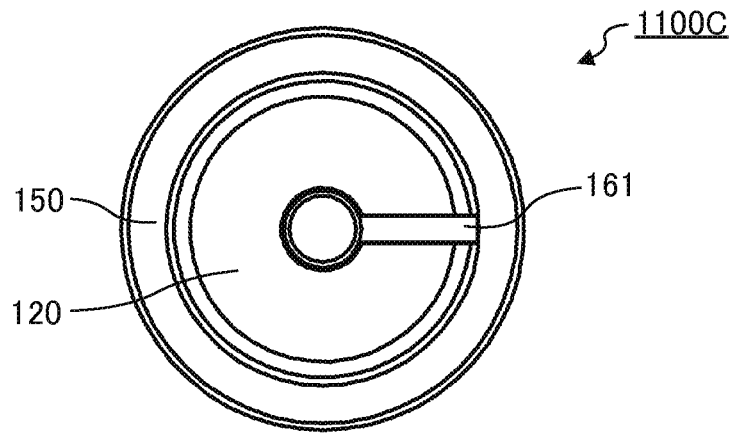

It is noted that the shape and the number of plate-like part 161 are not limited to the mode illustrated in FIG. 17. For example, as illustrated in FIG. 18A (bottom view), in light flux controlling member 1100A of Embodiment 8, one plate-like part 161 and the other plate-like part 161 may be disposed 120 degrees away from each other circumferentially around central axis CA. Further, as illustrated in FIG. 18B (bottom view), in light flux controlling member 1100B of Embodiment 8, one plate-like part 161 and the other plate-like part 161 may be disposed 60 degrees away from each other circumferentially around central axis CA. Further, as illustrated in FIG. 18C (bottom view), in light flux controlling member 1100C of Embodiment 8, one plate-like part 161 and the other plate-like part 161 may be overlapped. That is, second emission part 160 may have a single plate-like part 161.

(Effect)

Light flux controlling members 1100, 1100A, 1100B, and 1100C of the present embodiment have effects similar to those of light flux controlling member 100 of Embodiment 1.

Figure 19A:
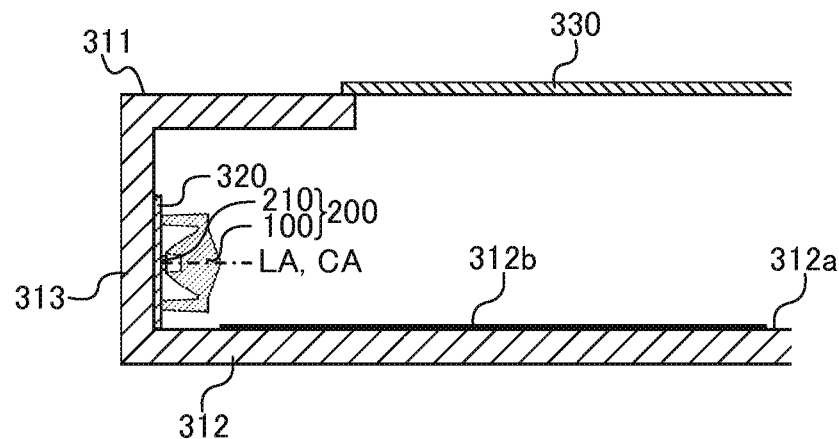
FIGS. 19A to 19C are drawings showing the configuration of a modification of the surface light source device of the present invention.

It is noted that, while, in the aforementioned each embodiment, explanation was given for a surface light source device in which the entire internal surface of bottom plate 312 is diffusion and reflection surface 312a, regular reflection surface 312b may be formed in an area in the vicinity of a light flux controlling member among internal surface 312a of bottom plate 312, as illustrated in FIG. 19A (sectional view).

Figure 19B:
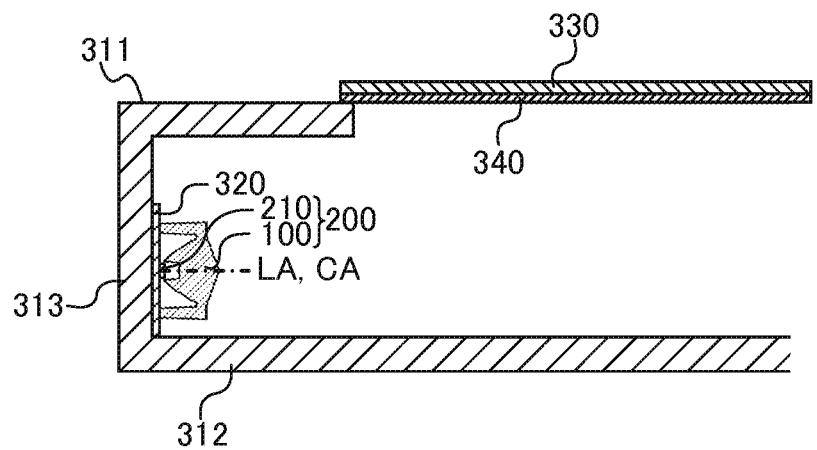

Further, while, in the aforementioned each embodiment, explanation was given for a surface light source device in which light passing through the opening of top plate 311 directly reaches light-emitting planar member 330, prism sheet 340 may be disposed on the internal surface of light-emitting planar member 330, as illustrated in FIG. 19B (sectional view). Prism sheet 340 has a plurality of sectionally triangular linear protrusions facing light-emitting planar member 330 and being formed along the direction of optical axis LA of light emitting element 210. The linear protrusion of prism sheet 340 functions as a total reflection prism, and reflects reached light toward the side of bottom plate 312, thereby guiding light emitted from a light flux controlling member farther.

Figure 19C:
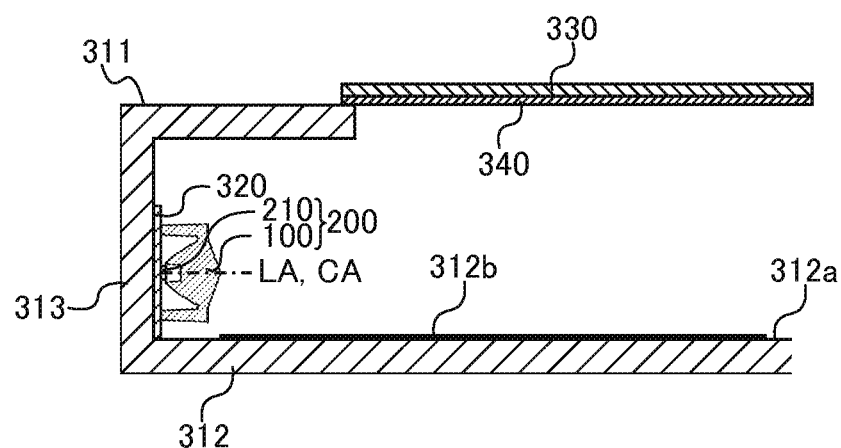

Further, as illustrated in FIG. 19C (sectional view), regular reflection surface 312b and prism sheet 340 may be disposed.

Figure 20:
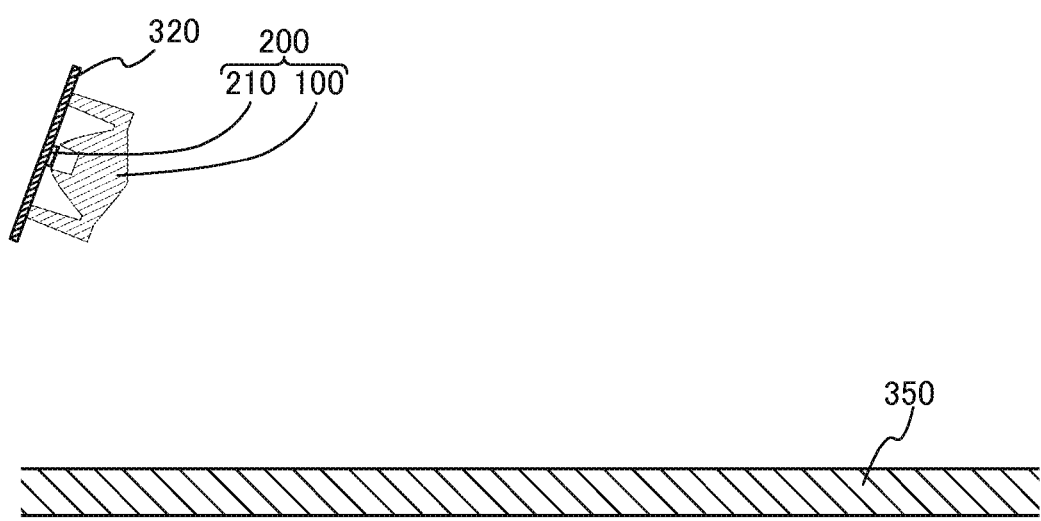
FIG. 20 is a sectional view showing another example of the illumination apparatus of the present invention.

In each of the aforementioned embodiments, explanations were given for an illumination apparatus (surface light source device 300) in which light transmits through a member to be irradiated (light-emitting planar member 330) disposed substantially parallel to optical axis LA of light emitting element 210. Such illumination apparatus is suitable as a backlight of a liquid crystal display apparatus, a ceiling light, an internal illumination signboard, and the like. On the other hand, in the illumination apparatus of the present invention, a member to be irradiated does not need to transmit light. For example, as illustrated in FIG. 20, light may be irradiated on a member to be irradiated that does not transmit light (e.g., wall surface, signboard on which a picture or a letter is described, etc.). In the example illustrated in FIG. 20, light emitting device 200 is disposed such that optical axis LA of light emitting element 210 intersects a surface to be irradiated of member to be irradiated 350 at an acute angle. In this case, by disposing light flux controlling member 100 such that a plane including second emission part 160 and a surface to be irradiated of member to be irradiated 350 intersect each other at an acute angle, it becomes possible to convert light emitted from second emission part 160 to light that effectively illuminates an area being likely to be a dark part between light emitting devices 200. Such illumination apparatus is suitable as wall surface luminaire, an external illumination signboard, and the like.

The present application is entitled to and claims the benefit of Japanese Patent Application No. 2012-140930 filed on Jun. 22, 2012, the disclosure each of which including the specification, drawings and abstract is incorporated herein by reference in its entirety.

INDUSTRIAL APPLICABILITY

The light flux controlling member, light emitting device and illumination apparatus of the present invention are useful, for example, for a back light of a liquid crystal display apparatus, a surface illumination apparatus, or the like. Further, the light flux controlling member and illumination apparatus of the present invention can also apply, for example, to wall surface luminaire, a downlight, and the like.

REFERENCE SIGNS LIST

100 Light flux controlling member
110 Incident part
111 Internal top plate
112 Internal side surface
113 Recess
120 Total reflection surface
130 First emission part
140 Flange
150 Holder
160 Second emission part
161 Plate-like part
200 Light emitting device
210 Light emitting element
300 Surface light source device
310 Housing
311 Top plate
312 Bottom plate
312a Diffusion and reflection surface
313-316 Side wall
320 Substrate
330 Light-emitting planar member
CA Central axis of light flux controlling member
LA Optical axis of light emitting element

The invention claimed is:

1. A light flux controlling member that controls a distribution of light emitted from a light emitting element, comprising:
    an incident part that is formed at a back side of the light flux controlling member so as to intersect a central axis of the light flux controlling member and that receives light emitted from the light emitting element;
    a total reflection surface that is formed so as to surround the central axis and so as to have a diameter that gradually increases from the back side toward a front side of the light flux controlling member and that reflects a part of light incident on the incident part toward the front side;
    a first emission part that is formed at the front side so as to intersect the central axis and that emits light received directly from the incident part and light reflected at the total reflection surface toward the outside; and
    a second emission part being formed of at least one plate-like parts extending in a radial direction from the total reflection surface, the second emission part being configured to emit another part of light incident on the incident part toward the outside,
    wherein the total reflection surface is an arc-like curve that is convex toward the outside in a sectional view including the central axis, and
    the second emission part is connected to the total reflection surface.

2. The light flux controlling member according to claim 1, wherein the second emission part is formed of a pair of plate-like parts disposed 180 degrees away from each other circumferentially around the central axis.

3. A light emitting device comprising the light flux controlling member according to claim 2 and the light emitting element, wherein a central axis of the light flux controlling member and an optical axis of the light emitting element coincide with each other.

4. An illumination apparatus comprising the light emitting device according to claim 3 and a member to be irradiated with light emitted from the light emitting device, wherein the light emitting device is disposed such that the larger the emission angle of light emitted from the light emitting device relative to an optical axis of the light emitting element becomes, the smaller the incident angle to the member to be irradiated becomes.

5. The illumination apparatus according to claim 4, wherein the second emission part is formed of a pair of plate-like parts disposed 180 degrees away from each other circumferentially around the central axis, and
  the light emitting device is disposed such that a virtual straight line orthogonal to a central axis of the light flux controlling member and passing through an inside of the pair of plate-like parts and the member to be irradiated are parallel to each other.

6. A display apparatus comprising:
  the illumination apparatus according to claim 4; and
  a display member to be irradiated with light emitted from the illumination apparatus.

7. A light emitting device comprising the light flux controlling member according to claim 1 and the light emitting element, wherein a central axis of the light flux controlling member and an optical axis of the light emitting element coincide with each other.

8. An illumination apparatus comprising the light emitting device according to claim 7 and a member to be irradiated with light emitted from the light emitting device, wherein the light emitting device is disposed such that the larger the emission angle of light emitted from the light emitting device relative to an optical axis of the light emitting element becomes, the smaller the incident angle to the member to be irradiated becomes.

9. The illumination apparatus according to claim 8, wherein
  the second emission part is formed of a pair of plate-like parts disposed 180 degrees away from each other circumferentially around the central axis, and
  the light emitting device is disposed such that a virtual straight line orthogonal to a central axis of the light flux controlling member and passing through an inside of the pair of plate-like parts and the member to be irradiated are parallel to each other.

10. A display apparatus comprising:
  the illumination apparatus according to claim 8; and
  a display member to be irradiated with light emitted from the illumination apparatus.

* * * * *